(12) United States Patent
Averett et al.

(10) Patent No.: US 8,259,124 B2
(45) Date of Patent: Sep. 4, 2012

(54) DYNAMIC SEARCH RESULT HIGHLIGHTING

(75) Inventors: Ashley E. Averett, Sammamish, WA (US); Michael J. Gilmore, Bothell, WA (US); Philip P. Fortier, Seattle, WA (US)

(73) Assignee: Microsoft Corporation, Redmond, WA (US)

( * ) Notice: Subject to any disclaimer, the term of this patent is extended or adjusted under 35 U.S.C. 154(b) by 834 days.

(21) Appl. No.: 12/265,740

(22) Filed: Nov. 6, 2008

(65) Prior Publication Data

US 2010/0110099 A1    May 6, 2010

(51) Int. Cl.
*G09G 5/00* (2006.01)
*G06K 9/34* (2006.01)
*G06K 9/60* (2006.01)
*G06K 9/40* (2006.01)
*G06F 7/00* (2006.01)
*G06F 17/00* (2006.01)
*G06F 3/00* (2006.01)

(52) U.S. Cl. ........ 345/581; 345/592; 345/619; 707/723; 707/758; 707/766; 707/770; 715/200; 715/700; 715/968; 382/173; 382/176; 382/254; 382/306

(58) Field of Classification Search .......... 715/200, 715/700, 968; 707/713–723, 758–763, 766–767, 707/768–770; 345/581, 592, 426, 428, 589, 345/619, 660, 441, 467, 472; 382/175–177, 382/173, 164, 182, 254, 274, 276, 282, 299
See application file for complete search history.

(56) References Cited

U.S. PATENT DOCUMENTS

| | | | |
|---|---|---|---|
| 5,611,031 A * | 3/1997 | Hertzfeld et al. | 715/740 |
| 5,982,370 A | 11/1999 | Kamper | |
| 6,839,702 B1 | 1/2005 | Patel et al. | |
| 6,968,332 B1 | 11/2005 | Milic-Frayling et al. | |
| 2005/0154716 A1 | 7/2005 | Watson et al. | |
| 2008/0027933 A1 | 1/2008 | Hussam | |
| 2008/0046845 A1 | 2/2008 | Chandra | |
| 2008/0177717 A1 | 7/2008 | Kumar et al. | |
| 2008/0177994 A1* | 7/2008 | Mayer | 713/2 |
| 2009/0006543 A1* | 1/2009 | Smit | 709/203 |

(Continued)

OTHER PUBLICATIONS

Baudisch, et al. "Fishnet, A Fisheye Web Browser with Search Term Popouts: A Comparative Evaluation with Overview and Linear View", Retirved at<<http://iat.ubalt.edu/courses/old/idia614.185_Sp06/fish-eyeBrowser.pdf>>, AVI '04, May 25-28, 2004, Gallipoli (LE), Italy, ACM, pp. 133-140.

*Primary Examiner* — Weesner Sajous
(74) *Attorney, Agent, or Firm* — Boswell IP Law; J. Mason Boswell

(57) ABSTRACT

A dynamic highlighting system initially applies a high-level highlight to occurrences of one or more keywords in a search result that fades to a low-level highlight effect. The system receives search results from a search engine and identifies occurrences of keywords in the search results. The system applies a first highlight effect to identified occurrences of the keywords and displays the search results incorporating the highlighted keywords. Upon detecting the occurrence of a highlighting change event, such as the expiration of a timer, the system applies a second highlight effect to the displayed search results. The second highlight effect may include removing the highlight or displaying a muted highlight effect. Thus, the dynamic highlighting system provides an initial noticeable highlight that fades to a level that is still noticeable but is less likely to distract the user from other elements of the user interface.

17 Claims, 4 Drawing Sheets

U.S. PATENT DOCUMENTS

2009/0113293 A1* 4/2009 Schubert ...................... 715/256
2009/0299976 A1* 12/2009 Dexter ............................. 707/3
2010/0131881 A1* 5/2010 Ganesh ........................ 715/769
2010/0241507 A1* 9/2010 Quinn et al. ............... 705/14.42

* cited by examiner

DYNAMIC SEARCH RESULT HIGHLIGHTING

BACKGROUND

Searching is a common way to find various types of data. For example, web search engines help users find web pages based on one or more keywords. Desktop search is a popular way to find data stored on a user's local computer. A commonly cited statistic states that 80% of a company's data is contained in unstructured data, which may be easiest to access using searching. The data for a desktop search may include files and directories, documents, email messages, and many other types of data. A search begins with a search query that contains one or more keywords. A search engine receives the search query and looks up the keywords in an index to identify matching content items. The search engine provides information about the matching content items as search results. For example, a web search engine provides hyperlinks to matching web pages and may display a short description of the web page next to the link. A desktop search engine may display links to local data, including properties of the data, such as the author of a document, the path to a file, and so forth.

Search result highlighting calls a user's attention to occurrences of the keywords used in the search query that are present in the search results by modifying the way that the user interface displays occurrences of the keywords. For example, some applications apply highlighting to occurrences of keywords that appears much like a physical yellow (or other color) highlighter appears to words on paper. Other applications boldface or italicize occurrences of keywords. Highlighting keywords helps the user identify relevant search results quickly by calling out the most relevant parts of potentially long descriptions or content item properties.

A problem with search result highlighting is that it can be loud and overwhelming for the user and does not always add the value intended by the application author. Some applications display colors, bold, or other display effects normally when displaying content item properties, so that the colors or boldface of search result highlighting may detract from the look and feel that the application author intended. For example, Windows Vista displays icons (e.g., the yellow Microsoft Outlook email message icon) next to content items in search results that can have similar colors to a highlight effect. As another example, Windows Explorer displays album ratings as one to five yellow stars and various colors throughout the user interface. Previous solutions modify the highlight effect to reduce the perceived noise while unfortunately correspondingly reducing the ability of the highlighting to catch the user's attention. For example, Microsoft SharePoint boldfaces occurrences of search query keywords in search results. This technique does not work for all languages, such as Chinese. As another example, some applications change the text color of occurrences of keywords in search results. This technique does not work for colorblind users. Both of these methods produce a less noticeable highlight as well as introducing other limitations.

SUMMARY

A dynamic highlighting system is described that initially applies a high-level highlight to occurrences of one or more keywords in the search result that fades or otherwise changes to a low-level highlight effect or goes away entirely. The system receives search results from a search engine and identifies occurrences of keywords that are present in the search results. The system applies a first highlight effect to identified occurrences of the keywords and displays the search results incorporating the highlighted keywords. Upon detecting the occurrence of a highlighting change event, such as the expiration of a timer, the system applies a second highlight effect to the displayed search results. The second highlight effect may include removing the highlight or displaying a less distracting highlight effect, such as a box around keywords or a traditional yellow box highlight effect that is more faded than the first highlight effect. The system may also animate the transition between the first and second highlight effect, so that the fade is gradual. Unlike previous static solutions to reducing the noise of search result highlighting, the dynamic highlighting system provides an initial noticeable highlight that fades to a level that is still noticeable but is less likely to distract the user from other elements of the user interface. The result is a more compelling user interface that does not compromise the value of search result highlighting.

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter.

DETAILED DESCRIPTION

A dynamic highlighting system is described herein that initially applies a high-level highlight to occurrences of one or more keywords in the search result that fades or otherwise changes to a low-level highlight effect or goes away entirely. The system receives search results from a search engine. For example, the search engine may provide results as text, hypertext markup language (HTML), extensible markup language (XML), or another suitable format. The system identifies occurrences of keywords that are present in the search results. For example, the system may store the search query entered by the user and scan the results for keywords within the query. The system applies a first highlight effect to identified occurrences of the keywords. For example, the system may apply a traditional bright yellow box highlight effect over keywords. The system then displays the search results incorporating the highlighted keywords. For example, the system may present a list of search results to the user in a user interface.

Upon detecting the occurrence of a highlighting change event, the system applies a second highlight effect to the displayed search results. For example, the system may set a timer after initially displaying the search results, and upon detecting that the timer has expired (e.g., several seconds) switch to the second highlight effect. The second highlight effect may include removing the highlight or displaying a less distracting highlight effect, such as a box around keywords or a traditional yellow box highlight effect that is more faded (e.g., more muted colors) than the first highlight effect. The system may also animate the transition between the first and second highlight effect, so that the fade is gradual. Unlike previous static solutions to reducing the noise of search result highlighting, the dynamic highlighting system provides an initial noticeable highlight that fades to a level that is still noticeable but is less likely to distract the user from other elements of the user interface. In some cases, a more muted highlight effect remains so that the user gets the benefit of being able to quickly identify the occurrences of keywords in the search results, but any colors or other effects normally displayed in the search results are not be drowned out by the highlight effect. The result is a more compelling user interface that does not compromise the value of search result highlighting for enhancing the visibility of keywords.

Figure 1:
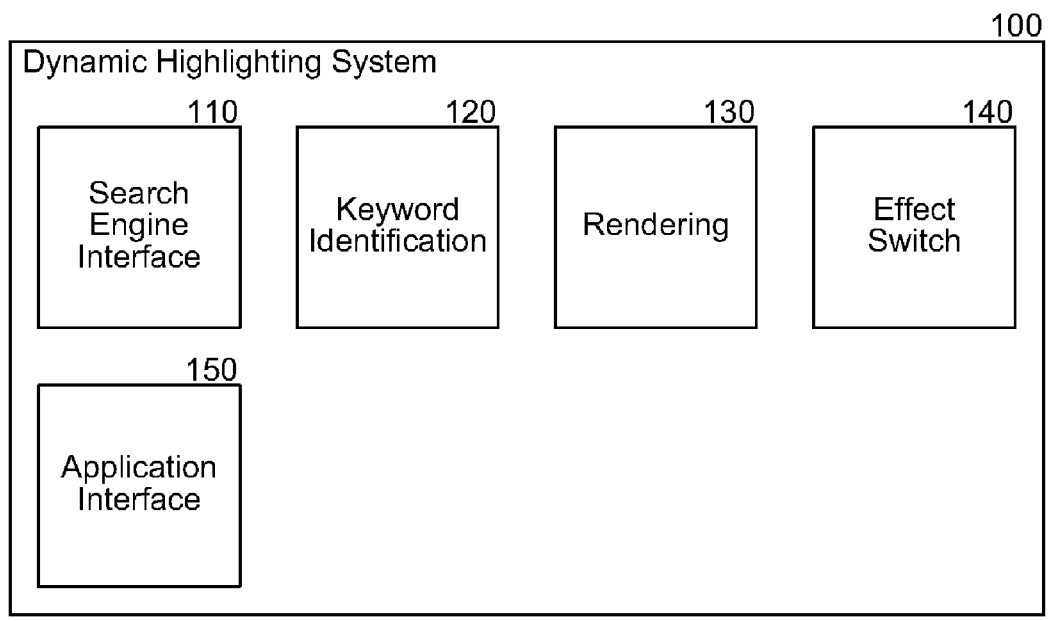
FIG. 1 is a block diagram that illustrates components of the dynamic highlighting system, in one embodiment.

FIG. 1 is a block diagram that illustrates components of the dynamic highlighting system, in one embodiment. The dynamic highlighting system 100 includes a search engine interface component 110, a keyword identification component 120, a rendering component 130, an effect switch component 140, and an application interface component 150. Each of these components is described in further detail herein.

The search engine interface component 110 of the dynamic highlighting system 100 receives search results from a search engine. For example, a user may submit a query to the search engine through a user interface presented by an application, and the system 100 submits the search query to the search engine for processing. The search engine identifies matching content items in the search engine index and provides one or more search results to the application through the search engine interface component 110. The search engine may provide results in batches when the search is complete or individually over time as the search engine identifies new search results. Some searches can take enough time that the system 100 provides a more satisfying user experience by providing the user with some early search results quickly while waiting for the search engine to produce further results that take longer to find. Those of ordinary skill in the art will recognize various common synchronous and asynchronous application programming interface (API) paradigms for receiving search results in batches or on an ongoing basis.

The keyword identification component 120 of the dynamic highlighting system 100 identifies occurrences of one or more keywords from a search query in the received search results. For example, the keyword identification component 120 may scan the search results to identify occurrences of the keywords. When the keyword identification component 120 identifies the location of a keyword, the component 120 stores the location in a data structure for use by the rendering component 130. Keywords may include individual words in search results or may be part of words within search results. For example, the keyword "read" may occur individually or within the word "reading." Keywords may also wrap across lines. The keyword identification component 120 identifies these situations and stores information for the rendering component 130 to correctly highlight the keywords based on their positions within the search results.

The rendering component 130 displays the search results in a particular layout (e.g., a list) and applies one or more highlight effects to identified occurrences of keywords in the search results. The rendering component may alter the displayed highlight effects based on instructions from the effect switch component 140 and provide a transition between highlight effects. For example, the rendering component 130 may increase the opacity of a new highlight effect in steps over a fixed period while decreasing the opacity of an old highlight effect. This produces the appearance to the user that the old highlight effect fades into the new highlight effect.

The effect switch component 140 switches the displayed search results from one highlight effect to another highlight effect and notifies the rendering component 130 to display the transition. For example, the effect switch component 140 may initially select a bright highlight when the system 100 first displays the search results. After the system 100 has displayed the search results for a certain period, the effect switch component 140 may select a softer highlight (e.g., less bright). The effect switch component 140 directs the rendering component 130 to apply the selected highlight effect to the search results.

The application interface component 150 interfaces with other aspects of the application in which the dynamic highlighting system 100 is incorporated. The dynamic highlighting system 100 may be implemented as a rendering module that more than one application can invoke through a predefined interface to display search results with highlighting as described herein. Alternatively or additionally, the dynamic highlighting system 100 may be incorporated into a single application and may interact with other components or systems for searching and interacting with search results. Those of ordinary skill in the art will recognize various common ways for incorporating extra components into an application. For example, the system may be embodied in a component object model component (COM), invoked directly through as a dynamically linked library (DLL), or statically linked as a library (LIB).

The computing device on which the system is implemented may include a central processing unit, memory, input devices (e.g., keyboard and pointing devices), output devices (e.g., display devices), and storage devices (e.g., disk drives). The memory and storage devices are computer-readable media that may be encoded with computer-executable instructions that implement the system, which means a computer-readable medium that contains the instructions. In addition, the data structures and message structures may be stored or transmitted via a data transmission medium, such as a signal on a communication link. Various communication links may be used, such as the Internet, a local area network, a wide area network, a point-to-point dial-up connection, a cell phone network, and so on.

Embodiments of the system may be implemented in various operating environments that include personal computers, server computers, handheld or laptop devices, multiprocessor systems, microprocessor-based systems, programmable consumer electronics, digital cameras, network PCs, minicomputers, mainframe computers, distributed computing environments that include any of the above systems or devices, and so on. The computer systems may be cell phones, personal digital assistants, smart phones, personal computers, programmable consumer electronics, digital cameras, and so on.

The system may be described in the general context of computer-executable instructions, such as program modules, executed by one or more computers or other devices. Generally, program modules include routines, programs, objects, components, data structures, and so on that perform particular tasks or implement particular abstract data types. Typically, the functionality of the program modules may be combined or distributed as desired in various embodiments.

Figure 2:
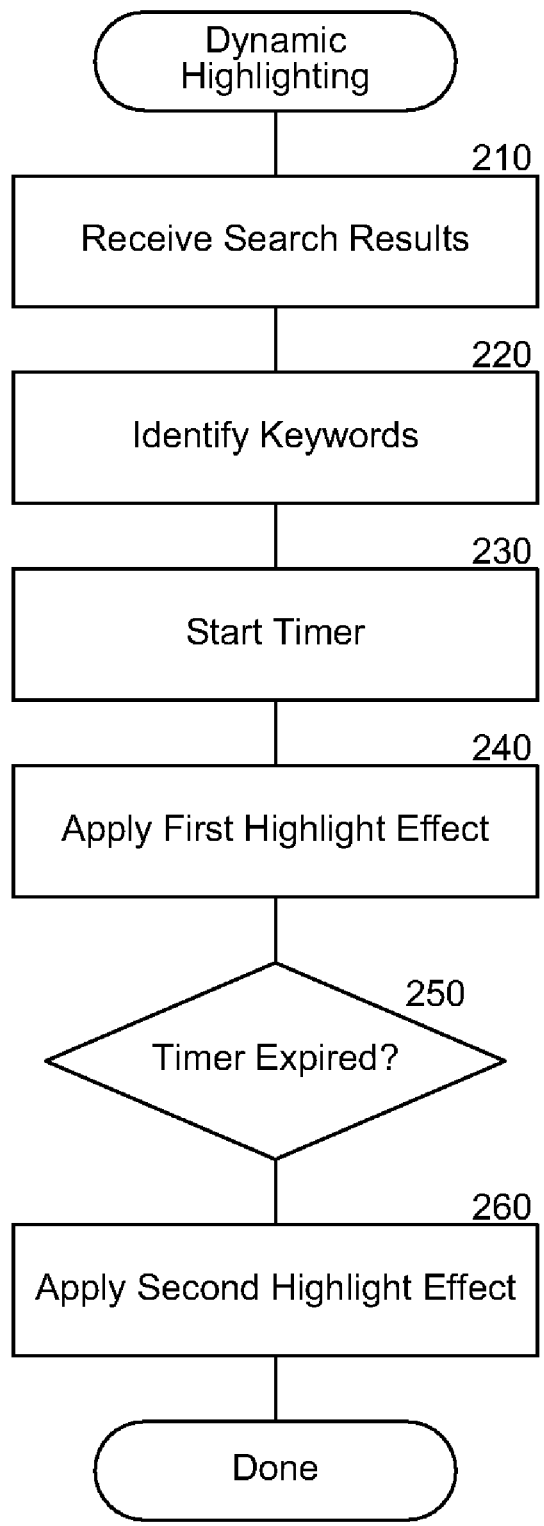
FIG. 2 is a flow diagram that illustrates the processing of the dynamic highlighting system to highlight search results, in one embodiment.

FIG. 2 is a flow diagram that illustrates the processing of the dynamic highlighting system to highlight search results, in one embodiment. In block 210, the system receives search results from a search engine based on a previously submitted query. For example, if the user submits a query containing the keyword "account" the system may receive a list of documents containing the word "account." In block 220, the system identifies keywords from the search query that occur in the search results. For example, if the search results contain a summary of each result that shows text around matching keywords, then the system locates the occurrences of the keywords in the summary and determines their location. In block 230, the system starts a timer that determines the amount of time the system will display a first highlight effect. For example, the system may start the timer when the system receives the first search result and set the timer for short amount of time (e.g., five seconds).

In block 240, the system displays the search results with the first highlight effect. For example, the system may display the search results with a bright yellow highlight around each identified keyword. In decision block 250, if the timer has expired, then the system continues at block 260, else the system loops to block 250 to wait for the timer to expire. In block 260, the system displays the search results with a second highlight effect that is more subtle than the first highlight effect. For example, the second highlight effect may leave a box around each identified keyword but remove the yellow color. Alternatively or additionally, the system may remove the highlight effect entirely. After block 260, these steps conclude.

In some embodiments, the dynamic highlighting system applies a highlight around one or more keywords using a nine-grid element. A nine-grid element is a grid of nine cells, where the center cell contains the keyword that the system will highlight. The cells to the top, bottom, left, and right contain an area larger than the keyword (e.g., padding) to which the system also applies the highlight effect. The corner cells provide a shape to the highlight effect, such as rounded or square corners. From a user interface design perspective, a nine-grid slice is used to preserve the proportional integrity and image fidelity of aspects of a design asset. For example, when a typical design asset is scaled, some image quality is usually lost because the resolution of the asset (e.g., an image, text, and so on) is too low to provide a satisfactory resolution at the larger size. However, using a nine-grid element or slice, the scaling of each cell can be different, so that, for example, rounded corners or other effects are not scaled as much as straight parts of the grid (e.g., the top, bottom, left, and right cells). Thus, using a nine-grid element allows the system to display a higher quality graphic element than a simple yellow rectangle as is typically used for hit highlights.

Figure 3:
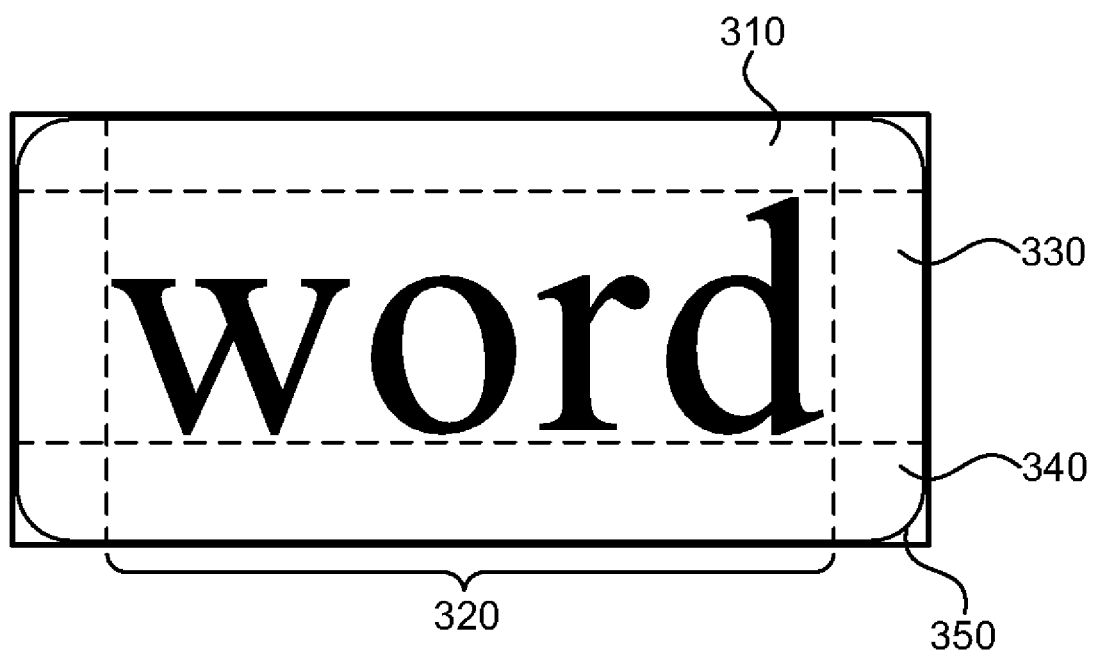
FIG. 3 is a block diagram that illustrates a nine-grid element, in one embodiment.

FIG. 3 is a block diagram that illustrates a nine-grid element, in one embodiment. The center cell 310 contains a keyword 320, in this example the keyword "word." The edge cells such as edge cell 330 determine how much padding the system will display at each edge of the highlighted keyword. For example, if whitespace (e.g., spaces, tabs, and so on) is adjacent to an edge of the keyword, then the system may display more padding at that edge. The corner cells such as corner cell 340 determine the shape of a highlighted region 350. For example, the highlighted region 350 may have rounded corners. Note that regardless of the size of the nine-grid element, the system can keep the corner cells the same size or scale them less than edge cells and the center cell 310.

Figure 4:
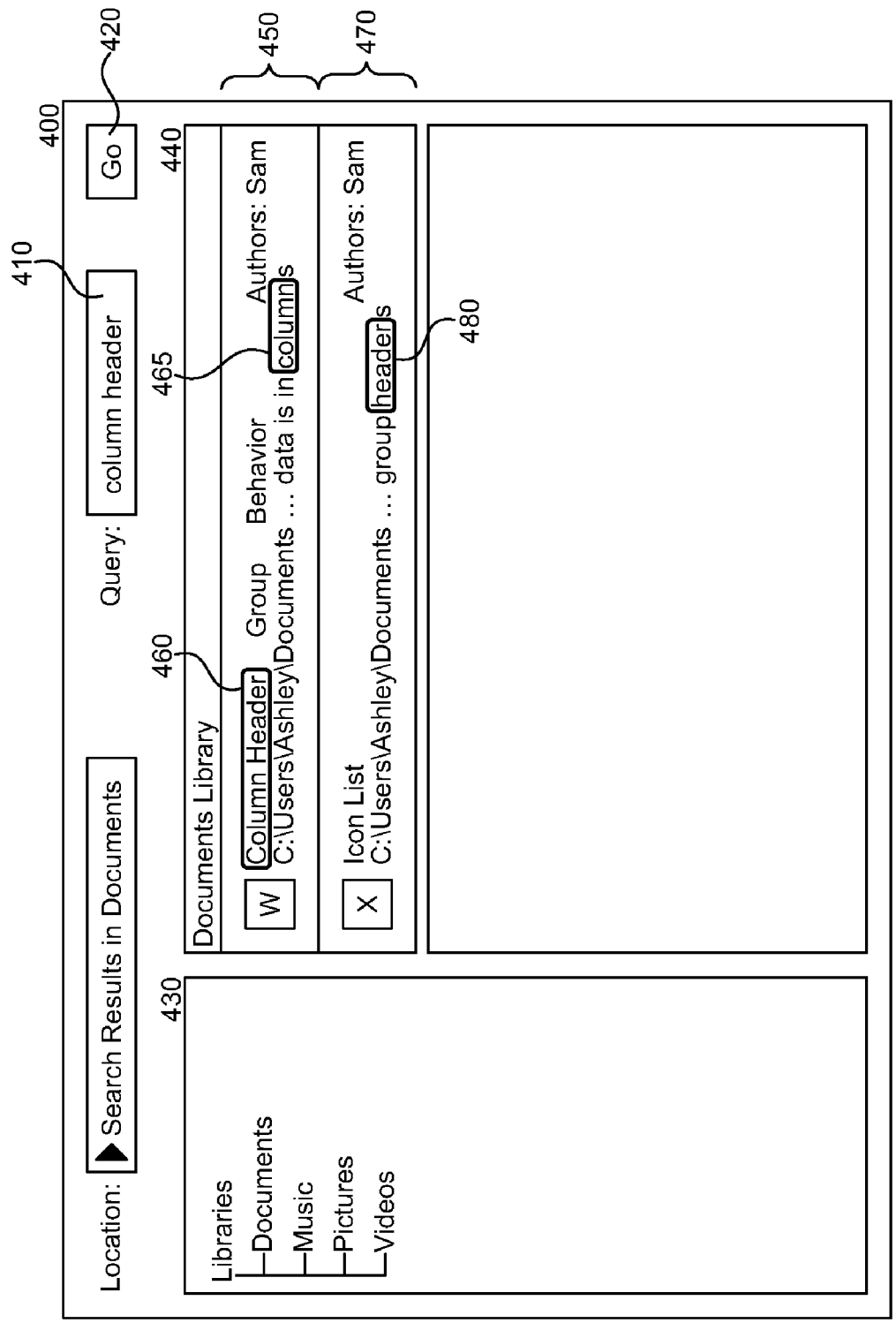
FIG. 4 is display diagram that illustrates a display page of an application containing a list of search results highlighted by the dynamic highlighting system, in one embodiment.

FIG. 4 is display diagram that illustrates a display page of an application containing a list of search results highlighted by the dynamic highlighting system, in one embodiment. The display page 400 includes a query entry box 410, a query initiation button 420, a list of content item locations 430, and a search result list 440. A user enters a query containing one or more keywords in the query entry box 410. For example, the user has entered the query "column header" that contains the keywords "column" and "header." The query initiation button 420 starts the query and may not be present. For example, the system may automatically start a search based on the query when the user pauses for a certain period or hits the Enter key. The list of content item locations 430 includes one or more locations that the user can search, such as folders on the user's hard drive and other data repositories, such as an email store. The search result list 440 contains the list of search results identified by the search engine based on the user's query.

In this case, the system has received two search results. The first search result 450 is a word processing document entitled "Column Header Group Behavior." The search result lists other properties of the word processing document, such as the path "c:\Users\Ashley\Documents" where the content item was found, and a selected portion of the text in the document that says, " . . . data is in columns." The search result 450 contains several occurrences of the keywords in the search query that the system has highlighted. For example, both keywords occur at location 460. The system has coalesced the highlighting of the two individual keywords "column" and "header" to highlight the phrase "column header" using one highlight box for a more elegant user experience. The system has also highlighted a keyword at location 465 within a larger word, namely the keyword "column" within the word "columns."

Where there is whitespace at an edge of a keyword, the system may apply a larger highlight by padding the edges of the highlighted region. For example, at location 460, the system can apply a larger highlight because there is whitespace at each edge. However, at location 465, the system has not padded the right edge of the keyword to avoid including other letters of the word that are not part of the keyword within the highlighting effect.

Similarly, the second search result 470 is a spreadsheet document entitled "Icon List" that contains the keyword "header" that is shown in the summary text highlighted at location 480. The system displays the highlight at a high level initially and fades the highlight after several seconds. This calls the user's attention to the highlighted keywords initially and then allows the user to notice other properties of each document that may help the user determine which document satisfies the user's search. The displayed properties of each search result may include color and font effects such as bold, italics, and so on. By fading the highlight after several seconds, the system reduces the chance that the highlighting applied by the system will interfere with the application author's design for the color and other effects in the search result list 440.

In some embodiments, the dynamic highlighting system starts a timer when the system receives the first search result and continues to receive other search results. For example, the search engine may provide results to the system as the search engine identifies matching results so that the user does not have to wait for the search engine to complete an exhaustive before the system displays any results to the user. The system may apply a first highlight effect to any results received during the duration of the timer, and then transition to a second highlight effect. The system may only apply the second highlight effect to results that the system receives after the expiration of the timer.

In some embodiments, the dynamic highlighting system the system waits until the search is complete and the system has received all results before starting the timer described herein. In such embodiments, the system applies both the first and second highlight effects to each of the search results for the lifetime of the timer.

In some embodiments, the dynamic highlighting system sets a timer for each search result to allow the system to display each search result with both the first and second highlight effects, but still provide the user with quick feedback as soon as the system receives each search result. These embodiments call the user's attention to occurrences of the keywords in each search result while still muting the highlight effect to avoid overpowering other user interface elements that the application displays to the user.

In some embodiments, the dynamic highlighting system fades the first highlight effect into the second highlight effect over several steps. For example, the system may decrease the opacity of the first highlight effect in steps over time (e.g., 10% per 100 milliseconds) while correspondingly increasing the opacity of the second highlight effect. This makes the first highlight effect appear to morph or smoothly transition to the second highlight effect. The system may also animate the highlight effects, such as by initially brightening the first highlight effect or other animations that provide a desirable user experience.

In some embodiments, the dynamic highlighting system highlights portions of words containing keywords. For example, if "key" is one of the keywords then the system may highlight the first three letters where the word "keyboard" appears in the search results. The system may adjust the width of the highlighted area to avoid encompassing other letters of the word that are not part of the keyword in the highlighted area.

In some embodiments, the dynamic highlighting system coalesces adjacent highlights. For example, if a user submits the query "column header" the system searches for occurrences of the keywords "column" and "header" separately, but highlights using a single region locations in the search results that contain both words. This can help the user to more quickly identify phrases in the search query that are also found in the search results, although it should be noted that the order of the words in the search query does not affect the coalescing described. For example, the system would also coalesce occurrences of "header column" into a single highlighted region for the same query.

In some embodiments, the dynamic highlighting system splits highlighting across two different lines when a keyword wraps across the lines. For example, some applications automatically divide words with a hyphen across lines when a word occurs at the end of a line and is too long to fit completely on the line. For example, an application may divide the word "happen" into "hap-" on a first line, and "pen" on a subsequent line. If a user searches for "happen," the system will still highlight the word across the two lines by applying two different highlight regions to the two lines.

In some embodiments, the dynamic highlighting system operates for right-to-left languages. Right-to-left languages are those like Hebrew that users read from the right side of the page to the left side of the page. The operation of the system is similar for right-to-left languages, and the system applies the same functions described herein (e.g., highlighting portions of words, coalescing, splitting across lines, and so forth) to such languages.

In some embodiments, the dynamic highlighting system may not highlight some keywords that appear frequently. The system may set a length threshold (e.g., two letters) for the length of words to which the system applies highlighting. For example, if the word "a" is a search keyword, the system may not highlight all occurrences of the letter "a" in the search results to avoid overwhelming the user with highlighting since "a" is likely to occur frequently.

In some embodiments, the dynamic highlighting system uses a standard control for displaying highlighted search results and determining the pixel position of keywords in the displayed results. For example, the system may use the Microsoft Rich Edit Control included with Microsoft Windows. The system requests the pixel position of the characters of the keyword from the control. The system also requests information about whether there is whitespace present at the edges of the keyword. For edges adjacent to whitespace, the system pads the size of the highlighted area by several pixels. For example, the system may use the nine-grid element described herein and increase the size of the left or right cells.

In some embodiments, the dynamic highlighting system highlights occurrences of keywords within properties of content items in the search results. For example, search results that include documents may include document properties such as an author, summary, title, and so forth, and the system may highlight identified keywords anywhere within any of the properties, not just in a summary of body text of the document that the system displays as part of the search result.

In some embodiments, the dynamic highlighting system receives one or more configuration options that modify the operation of the system. The system may receive a configuration option that enables or disables the dynamic search result highlighting described herein. For example, an application or operating system employing the system may provide a user-configurable option to turn on or off search result highlighting or to define the type of highlighting used (e.g., dynamic or static, whether the system fades from one highlight effect to another, and so forth). The system may also receive configuration options from applications that invoke the system. For example, search result highlighting may be inappropriate for some applications that use a common control of which the system is a part, and the application may instruct the control not to apply search result highlighting when the application is hosting the system.

From the foregoing, it will be appreciated that specific embodiments of the dynamic highlighting system have been described herein for purposes of illustration, but that various modifications may be made without deviating from the spirit and scope of the invention. For example, application authors can apply the system to many different types of searches for many different types of content items or other searchable items. In addition, application authors can apply the system to fields other than search where it is desirable to call attention to some words in a body of text. For example, scanners that scan a document for confidential information before a user sends the document via email, or applications that have specific context for certain words (e.g., Microsoft SmartTags) are other examples of applications that may use the system to display a dynamic highlight around words. Accordingly, the invention is not limited except as by the appended claims.

We claim:

1. A computer-implemented method for enhancing the visibility of keywords in search results, the method comprising:
receiving search results from a search engine based on a search query, wherein the search query contains one or more keywords;
identifying occurrences of keywords in the search results;
displaying the search results in a user interface;
applying a first highlight effect to identified occurrences of keywords in the displayed search results;
detecting an occurrence of a highlighting change event; and
after detecting the highlighting change event,
animating a transition between the first highlight effect and a second highlight effect; and applying the second highlight effect to the displayed search results, such that a user receives an initial noticeable highlight that fades to a level that is still noticeable but is less likely to distract the user from other elements of the user interface.

2. The method of claim 1 wherein receiving search results comprises receiving results asynchronously as the search engine finds matching results.

3. The method of claim 1 wherein the first highlight effect includes a bright yellow box around the identified keywords.

4. The method of claim 1 wherein the second highlight effect includes removing the first highlight effect.

5. The method of claim 1 wherein the second highlight effect includes a faded representation of the first highlight effect.

6. The method of claim 1 further comprising setting a timer and wherein detecting the occurrence of the highlighting change event comprises detecting expiration of the timer.

7. The method of claim 1 further comprising coalescing the highlighting effect of adjacent keywords.

8. The method of claim 1 further comprising splitting the highlighting effect of keywords that span multiple lines across the lines.

9. The method of claim 1 further comprising padding the size of the highlighting effect of each identified keyword based on whether the identified keyword is adjacent to whitespace.

10. A computer system for dynamically highlighting keywords in search results, the system comprising:
a search engine interface component configured to receive search results from a search engine;
a keyword identification component configured to identify occurrences of one or more keywords from a search query in the received search results;
a rendering component configured to display the search results to a user and apply one or more highlight effects to identified occurrences of keywords in the search results;
an effect switch component configured to switch the displayed search results from a first highlight effect to a second highlight effect, wherein the effect switch component is further configured to fade the first highlight effect into second highlight effect by gradually varying an opacity associated with each highlight effect; and
an application interface component configured to communicate with an application that interacts with the system.

11. The system of claim 10 wherein the keyword identification component is further configured to identify the pixel position of the beginning and end of each keyword occurrence.

12. The system of claim 10 wherein the rendering component determines a size of the highlight region based on information about adjacent words and whitespace received from the keyword identification component.

13. The system of claim 10 wherein the application interface component is further configured to receive configuration information from the application that modifies behavior of the system based on application preferences.

14. A computer-readable storage medium encoded with instructions for controlling a computer system to invoke a search result highlighting component, by a method comprising:
receiving search results from a search engine based on one or more search keywords;
sending to the search result highlighting component the search results and information about the search keywords;
receiving from the search result highlighting component a first display layout for the search results that includes a first highlighting effect for occurrences of search keywords in the search results;
receiving from the search result highlighting component a second display layout for the search results that includes a second highlighting effect for occurrences of search keywords in the search results; and
dynamically switching a display from rendering the first display layout to rendering the second display layout, wherein dynamically switching comprises setting a timer when the first display layout is displayed and displaying the second display layout when the timer expires.

15. The computer-readable medium of claim 14 wherein the first and second display layouts do not highlight occurrences of search keywords below a threshold length.

16. The computer-readable medium of claim 14 wherein the first and second display layouts include highlighting of occurrences of keywords in properties associated with each search result.

17. The computer-readable medium of claim 14 wherein the first and second display layouts contain text in a right-to-left language.

* * * * *